United States Patent [19]

Roeser et al.

[11] Patent Number: 4,758,692

[45] Date of Patent: Jul. 19, 1988

[54] JOYSTICK TYPE CONTROL DEVICE

[75] Inventors: John O. Roeser, Barrington, Ill.; Leland L. Seghetti, Vallejo, Calif.

[73] Assignee: Otto Engineering, Inc., Carpentersville, Ill.

[21] Appl. No.: 52,251

[22] Filed: May 19, 1987

[51] Int. Cl.$^4$ ............... H01H 25/04; G01L 1/22; G05G 9/02

[52] U.S. Cl. ............... 200/6 A; 73/862.05; 74/471 XY; 338/2

[58] Field of Search ........... 73/862.04, 862.05, 862.68; 74/471 R, 471 XY; 200/5 R, 6 A, 17 R, 153 K, 153 T; 336/110, 131; 338/2-5, 47, 96, 99, 128; 340/365 R, 709

[56] References Cited

U.S. PATENT DOCUMENTS

| 3,385,942 | 5/1968 | McCann ....................... 200/6 A X |
| 3,666,900 | 5/1972 | Rothweiler et al. ....... 200/153 T X |
| 3,828,148 | 8/1974 | Roeser ..................... 200/6 A |
| 3,924,458 | 12/1975 | Woodworth et al. ........... 73/862.05 |
| 4,217,569 | 8/1980 | Nejedly et al. ............ 338/2 |
| 4,308,434 | 12/1981 | Roeser ..................... 200/6 A X |
| 4,555,960 | 12/1985 | King ..................... 73/862.05 X |

Primary Examiner—J. R. Scott
Attorney, Agent, or Firm—Robert D. Silver

[57] ABSTRACT

A multiposition precision joystick type control device having a transducer mode in which an actuator button is movable in any lateral direction away from a neutral position to cause flexure of flexible bar mechanism along one or both of two orthogonally related axes, there being a set of transducers for sensing such flexure and providing a coordinate-related signal to apparatus to be controlled, the control device having a depress mode in which the actuator button is axially depressed for actuation of a switch and thereby providing an alternate controlling function. Overload mechanism including a spring loaded articulated connection between the actuator button and the flexible bar mechanism limits the degree of flexure which can be imparted to the flexible bar mechanism by movement of the actuator button in any lateral direction from its neutral position to prevent damage to the sets of transducers. A first lock-out mechanism prevents simultaneous operation of the control device in transducer and depress modes, and a second lock-out mechanism prevents inadvertent operation of the control device in the depress mode.

31 Claims, 5 Drawing Sheets

JOYSTICK TYPE CONTROL DEVICE

BACKGROUND OF THE INVENTION

1. Field of the Invention

This invention relates to a multiposition precision joystick type control device useful, for example, in the control of vehicles of various sorts, such as underwater and surface craft, off road vehicles and aircraft, as well as in such applications as plotting boards and radar controls.

2. Description of the Prior Art

Joystick type control devices have found relatively wide application in the control of various machines and in particular in the control of vehicles. One particularly useful control device of this type has a digitally or manually controlled actuator which is movable in any lateral direction with respect to a first axis to cause flexure of flexible bar means having transducer means attached thereto. The transducers are responsive to flexure of the flexible bar means along a pair of orthogonally related second and third axes. Typically the transducers are piezoresistive strain gauges made of semiconductor material the resistivity of which changes when exposed to deformation forces. The strain gauges are incorporated into a bridge circuit, and the change in resistivity thereof is effective to differentially unbalance the bridge. Thus, compression or tension of the strain gauges caused by lateral displacement of the actuator provides a coordinate-related electrical output corresponding to the forces applied to the actuator along the second and third axes. Such electrical output is supplied to electroresponsive control means which provides a desired controlling function to apparatus to be controlled.

Because of the fragility of semiconductor type strain gauges, resort has been had in the past to the use of stop shoulders, typically adjustable stop screws, to limit the degree of flexure to which the flexible bar means having strain gauges attached thereto can be subjected. However, in precision applications, such expedients are not practical because of the extremely tight tolerances which are required.

Representative of the joystick type control devices of the prior art are those disclosed in the following U.S. patents: Palfreyman U.S. Pat. No. 3,447,766; Woodworth et al. U.S. Pat. No. 3,924,458; Vaiden et al U.S. Pat. No. 3,473,760; Colston U.S. Pat. No. 4,216,467, Rothweiler et al U.S. Pat. No. 3,666,900, and Strandh U.S. Pat. No. 3,832,895.

While the joystick type control devices of the prior art have found numerous applications, there is need to provide improved control devices which are multimodal and perform additional functions, are of small size and are of sealed precision construction. Moreover, there is need in such a control device to provide means for preventing operation in more than one mode at a time, as well as to provide means for preventing transducer damage in the event of application to the actuator member of a lateral force in excess of a predetermined magnitude.

SUMMARY OF THE INVENTION

With the foregoing in mind, it is a general object of the present invention to provide an improved joystick type control device having a transducer mode in which an actuator member thereof can be digitally moved in any lateral direction from a neutral position to provide coordinate-related controlling signals for the control of first apparatus to be controlled, said control device also having a depress or pushbutton mode in which axial depression of the actuator member causes actuation of control means for second apparatus to be controlled.

Another object of the invention is to provide an improved joystick-type control device of the aforementioned character having lockout means preventing operation thereof in more than one mode at any given time.

A further object of the invention is to provide a control device of the class described having overload protection means for preventing transducer damage in the event of application to the actuator member of a lateral force in any direction which is in excess of a predetermined magnitude.

A more specific object of the invention is to provide a control device as aforedescribed wherein the overload protection means takes the form of a spring loaded articulated connection between the actuator member and the flexible bar means on which the transducers are mounted, said connection providing the desired overload protection regardless of which lateral direction the actuator member is moved away from the neutral position thereof.

Another object of the invention is to provide a control device of the class described having lockout means preventing inadvertent operation of the control device in the depress mode.

A further object of the invention is to provide an improved control device of the aforementioned character having boot means associated with the actuator member and the control body, which boot means is effective to seal the body as well as to provide vibration damping for the movable elements of the control device.

Another object of the invention is to provide an improved control device as aforedescribed which is rugged and compact in construction and is well adapted to miniaturization.

Other and further objects of the invention will become apparent as the description proceeds, reference being had to the drawings which accompany and form a part of this application.

DESCRIPTION OF THE DRAWINGS

In the drawings, which illustrate two embodiments of the invention, and in which the same reference characters indicate like parts in all of the views.

DESCRIPTION OF THE PREFERRED EMBODIMENTS

Figure 1:
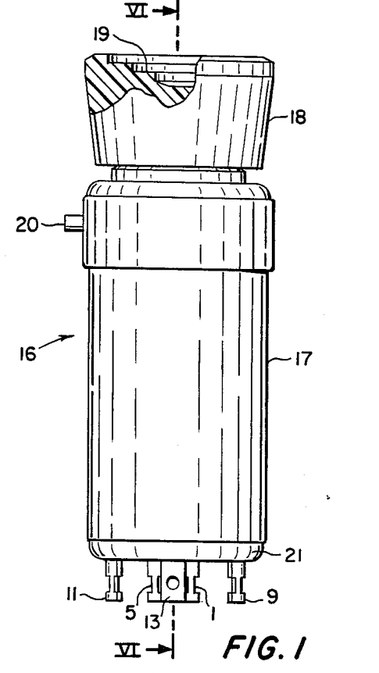
FIG. 1 is a side elevational view of the preferred form of improved control device which embodies the present invention, part of the actuator button thereof being shown in section.
Figure 2:
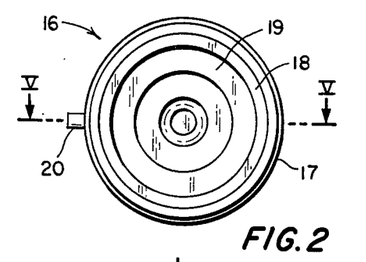
FIG. 2 is a top plan view of the control device shown in FIG. 1.
Figure 3:
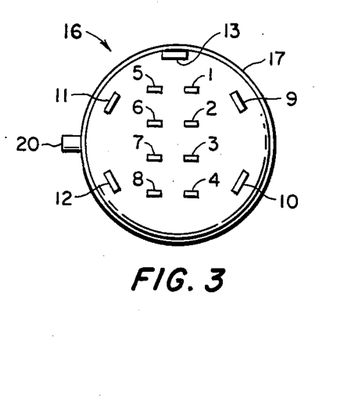
FIG. 3 is a bottom plan view of the control device shown in FIG. 1.

Turning now to FIGS. 1 to 3 of the drawing, the improved joystick type control device is indicated generally by the numeral 16 and comprises a tubular cylindrical case or body 17 of, for example, anodized aluminum, at one end of which is coaxially disposed actuator means in the form of a button 18 of fiberite nylon or other suitable material having a slightly tapered outer sidewall surface. The upper end of the button 18 is preferably formed with a stepped, circular concavity 19, and a stainless steel locating pin 20 projects radially from the upper end portion of the body 17 as shown.

Figure 5:
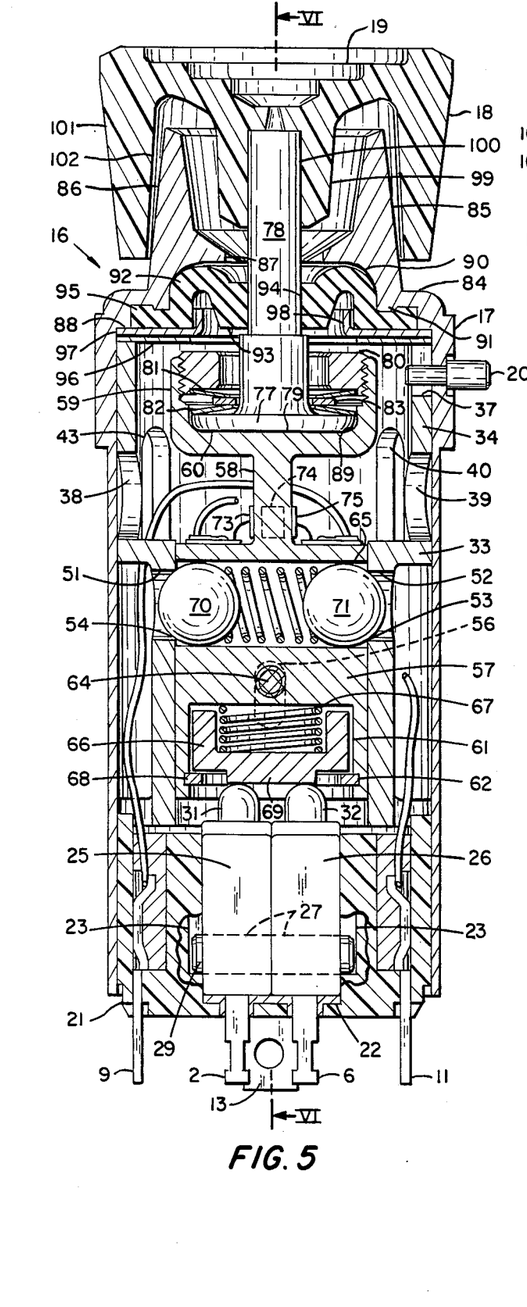
FIG. 5 is an enlarged axial sectional view of the improved control device taken along the line V—V of FIG. 2 and showing the parts thereof in the at rest position.
Figure 6:
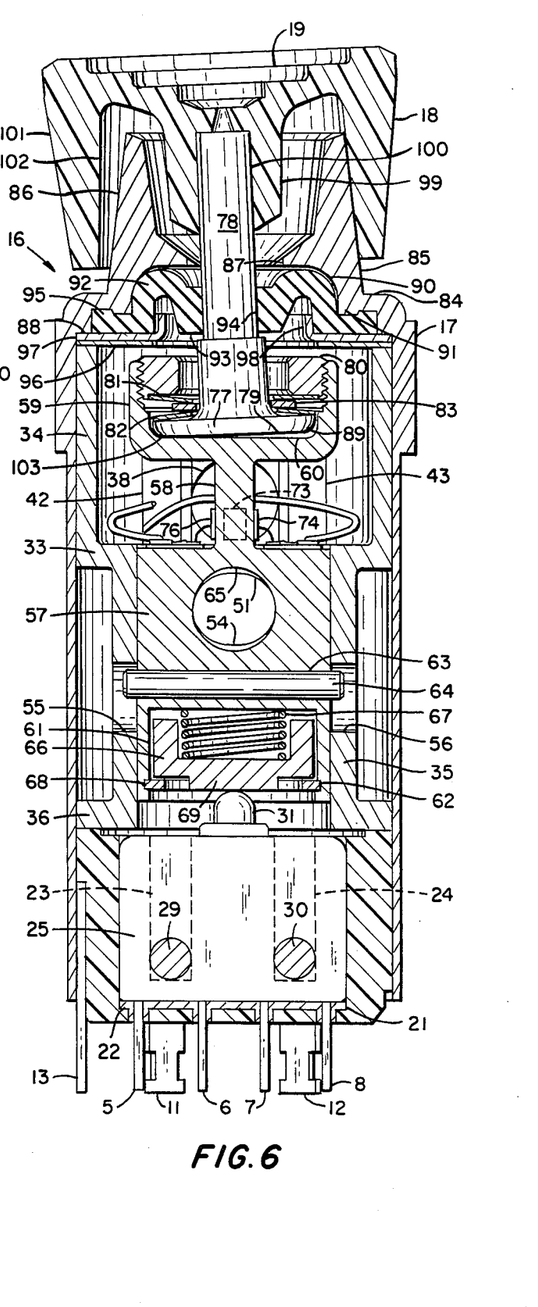
FIG. 6 is a view similar to FIG. 5 taken along the line VI—VI of FIGS. 1 and 5, except that the detent balls and detent spring are removed, said view illustrating the position of maximum lateral movement of the actuating button in the transducer mode of the control device, as well as the corresponding tilted relationship of elements of the spring loaded articulated connection.
Figure 7:
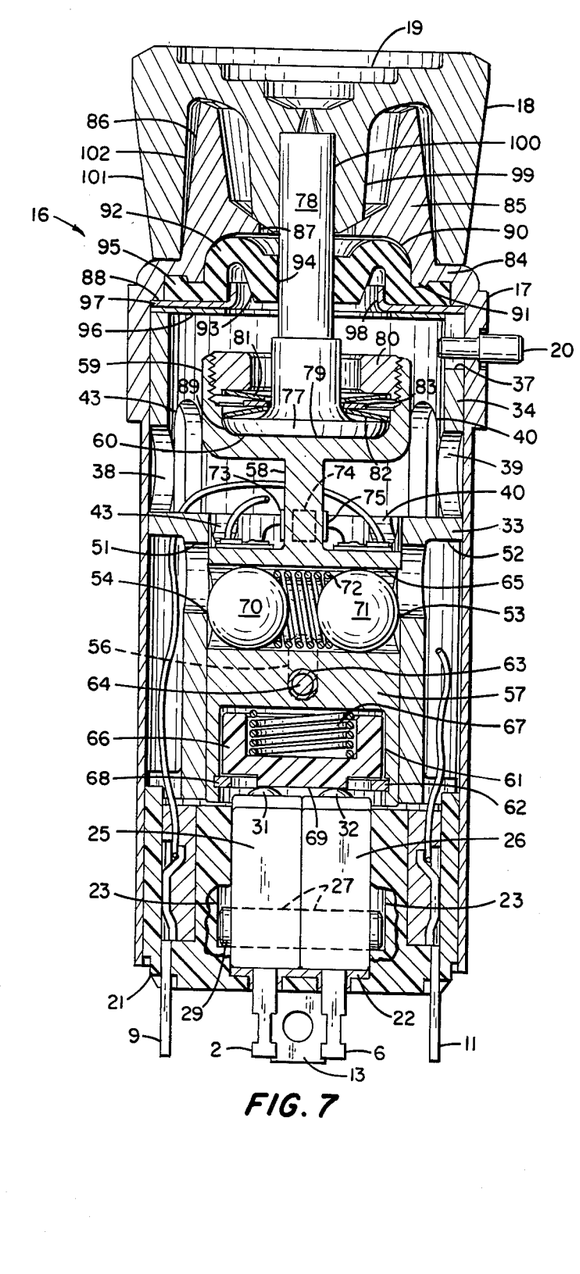
FIG. 7 is a view similar to FIG. 5 illustrating the positions of the movable parts of the improved control device in the depress mode.
Figure 8:
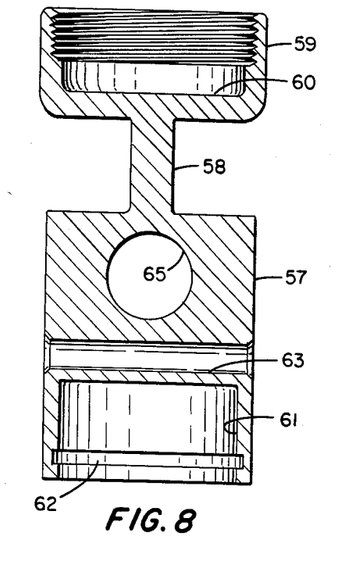
FIG. 8 is a somewhat enlarged axial sectional view of the transducer shaft of the improved control device in isolation, said view being taken along the same plane as FIG. 6.
Figure 9:
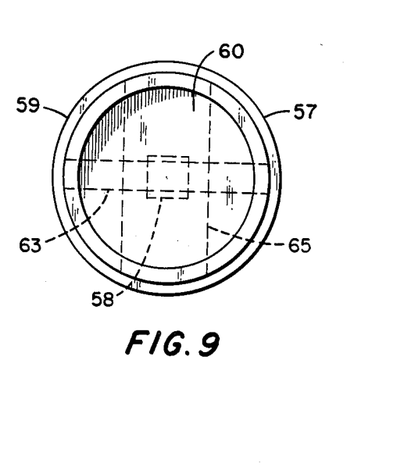
FIG. 9 is a bottom plan view of the transducer shaft shown in FIG. 8.
Figure 10:
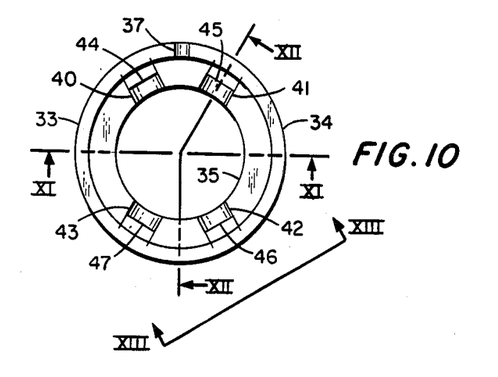
FIG. 10 is a top plan view on a reduced scale of the transducer sleeve of the improved control device in isolation.

Referring also to FIG. 5 to 7, the lower end of the case 17 is closed by a cylindrical base member 21 having a telescopic fit therein. The base 21 may be formed of any suitable insulating material, such as plastic, and is fixed in the illustrated position, as by staking of the body 17 thereto. The base 21 is formed with a rectangular open topped aperture 22 having formed in opposite sidewalls thereof pairs of spaced parallel vertical grooves 23 and 24 which are open at their upper ends.

Disposed within the aperture 22 is precision control means which, in the illustrated embodiment of the invention, takes the form of a pair of precision snap switches 25 and 26, each of which is of the double pole, double throw type. The precision switches 25 and 26 have high contact forces which make them readily usable in milliamp circuits as well as in conventional 24 volt circuits. The bodies of the switches 25 and 26 are rectangular and have a snug side-by-side fit within the recess 22. Each of the switches 25 and 26 is formed with a pair of spaced bores 27 and 28 to respectively snugly receive therein switch mounting pins 29 and 30, the ends of which are disposed in the slots 23 and 24, as best shown in FIG. 5 and 7. The switches 25 and 26 respectively have first actuator means in the form of push buttons 31 and 32 which are biased toward their normal raised position shown in FIGS. 4, 5 and 6, said buttons being movable axially to the depressed position thereof shown in FIG. 7.

Figure 11:
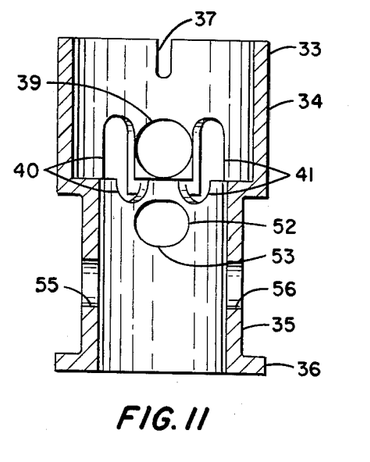
FIG. 11 is an axial sectional view of the transducer sleeve taken along the line XI—XI of FIG. 10.
Figure 12:
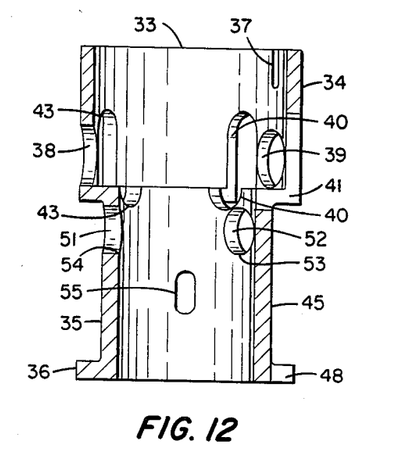
FIG. 12 is an axial sectional view of the transducer sleeve taken along a pair of angularly related radial planes indicated by the line XII—XII of FIG. 10.

Disposed coaxially within the body 17 and having its lower end in abutting relationship with the base 21 is a cylindrical transducer sleeve member 33 made, for example, of stainless steel and having an enlarged diameter upper portion 34 as well as a reduced diameter lower portion 35, the latter terminating at its lower end in an outwardly directed annular flange 36. Sleeve portion 34 and flange 36 both have a telescopic fit within the body 17 as shown in FIGS. 5 to 7. The sleeve 33 is formed with a locating slot 37 extending downwardly from the upper edge thereof, said slot being sized to receive the locating pin 20 as shown in FIGS. 5 and 7. The sleeve 33 is also formed with a pair of diametrically oppositely disposed aligned bores 38 and 39. On circumferentially opposite sides of the bore 39, the sleeve 33 is formed with axially extending oblong slots 40 and 41 (FIGS. 11 and 12), the lower ends of which project through the portion of the sleeve joining the enlarged diameter portion 34 with the reduced diameter portion 35 thereof as best shown in FIG. 12. On opposite bore 38, the sleeve 33 is formed with axially extending oblong slots 42 and 43 (FIG. 13) which are respectively diametrically oppositely aligned with the slots 40 and 41 and are of substantially identical size and shape as the latter.

Figure 13:
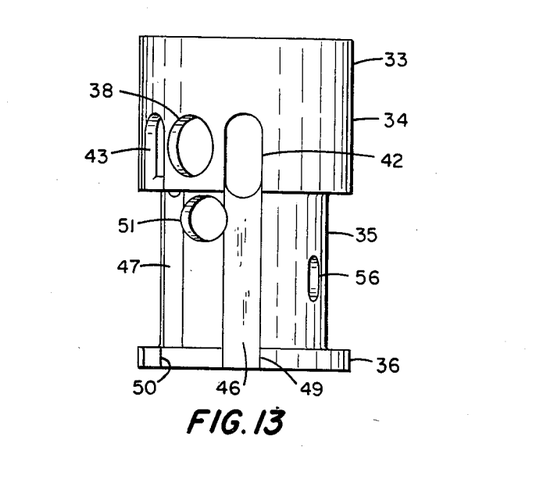
FIG. 13 is a side elevational view of the transducer sleeve viewed from the direction indicated by the arrows XIII—XIII in FIG. 10.

Extending axially along the outer surface of the sleeve portion 35 below each of the slots 40 to 43 are flat surface portions 44 to 47, respectively. The annular flange 36 is formed with notches or cutaway portions which register with said flat surfaces and through which the flat surfaces 44 to 47 respectively extend. In FIGS. 12 and 13, the notches 48, 49, and 50 are indicated, such notches being those through which the surfaces 45, 46, and 47 respectively extend. The cutaway portions in the flange 36 interfit with projections on the base 22 and also provide, along with the slots 40 to 43, access to the interior of the sleeve 33 for electrical wiring, as is apparent in FIGS. 5 and 7.

In axial alignment with and below the bores 38 and 39, the sleeve portion 35 is formed with diametrically oppositely aligned transversely oblong cutaway portions or openings 51 and 52, respectively. The openings 51 and 52 are of the same size and shape, and as best shown with respect to opening 52 in FIG. 6 and 11, have a transverse contour defined by a pair of like semicircular lines joined by a pair of parallel straight lines to form at the inner edge thereof a rectilinear, relatively sharp shoulder which is identified by the numeral 53. The opening 51 is formed with a corresponding rectilinear shoulder 54 which is indicated in FIGS. 5, 7 and 12. As shown in FIGS. 5 to 7, 11 and 12, the portion 35 of sleeve 33 is formed with a pair of diametrically oppositely alined axially extending oblong slots 55 and 56 whose alignment is normal to that of the openings 51 and 52.

A transducer shaft member 57 made, for example, of stainless steel, forms part of second actuating means and has a cylindrical lower end portion which is telescopically slidable within the reduced diameter portion 35 of the sleeve 33 and is cooperable with the switch buttons 31 and 32. The member 57 has an intermediate axially extending flexible bar portion 58, which is preferably square in cross section. Bar portion 58 terminates at its upper end in an upwardly opening cylindrical cup-shaped portion 59 which is internally threaded and is also formed with a flat inner end face 60. The lower end of the member 57 is formed with a downwardly opening coaxial cylindrical recess 61 which, in turn, is formed with annular groove 62. The lower end portion of the member 57 is also formed with a diametrically extending bore 63 within which is press fitted a pin 64 having end portions which project into the slots 55 and 56, as best shown in FIG. 6. Above the bore 63, and having its axis in a plane normal to that of bore 63, is a relatively larger diameter cylindrical detent bore 65. As best shown in FIG. 6, the longest dimension of the opening 52, and therefore also of the opening 51, is substantially equal to the diameter of the detent bore 65.

Coaxially positioned within the recess 61 of member 57 is a cylindrical cup-shaped overtravel plunger 66 made, for example, of nylon. A helical compression spring 67 is accomodated within plunger 66 and normally biases said plunger axially downwardly into abuttment with an annular snap ring 68 mounted in the annular groove 62. As shown in FIGS. 5 to 7, the axial dimension of the plunger 66 is such as to permit limited axial movement thereof within the recess 61 against the bias of the spring 67. The plunger 66 has a reduced diameter lower end portion 69 which, in the illustrated embodiment, is in continuous contact with the buttons 31 and 32 of the switches 25 and 26.

Detent means in the form of a pair of spherical balls 70 and 71 have snug slidable fit within the bore 65, there being a helical compression spring 72 interposed between said balls and biasing the same in opposite outward directions. When the parts of the improved control device 16 are in the at rest position shown in FIG. 5, the detent balls 70 and 71 are respectively seated in the openings 51 and 52 as shown.

Suitably bonded to the respective flat external wall surfaces of the flexible bar portion 58 of member 57 is transducer means which preferably takes the form of like semiconductor type piezoresistive strain gauges 73 to 76 respectively. It will be observed in FIGS. 5 to 7 that the strain gauges 73 and 75 are on opposite sides of the bar portion 58, and that gauges 74 and 76 are also on opposite wall surfaces of said bar portion.

Referring to FIGS. 5 to 7, a button shaft 78, made, for example, of stainless steel, has the button 18 coaxially press fitted on its upper end to provide therewith remote actuating means. Shaft 78 has a disc shaped head 77 formed on the lower end thereof, which head has a flat circular lower end face 79 and a rounded peripheral edge surface portion 89. The head 77 is normally coaxially disposed within the cup-shaped portion 59 of member 57 with the end face 79 thereof in flat face-to-face abutting relation with the inner end wall surface 60 of the cup-shaped portion 59, as shown in FIGS. 5 and 7. An externally threaded pretensioner ring or nut 80, preferably of stainless steel, surrounds the shaft 78 and is threaded into the cup-shaped portion 59 as shown. Spring loading means, in the form of a pair of oppositely facing conical bellville spring washers 81 and 82 and an intermediate flat stainless steel washer 83 surrounds the shaft 78 and is disposed between the nut 80 and the upper surface of head 77. This spring loading means biases the head 77 toward the flat inner end wall 60 of the cup-shaped portion 59, the amount of such bias being adjustable by adjustment of the position of rotation of the nut 80 with respect to the cup-shaped portion 59.

The case 17 has a transverse upper end wall 84 which is formed with an upwardly projecting coaxial hub 85 having a frustoconical outer surface 86 and a central aperture 87 through which the shaft 78 projects. The inner surface of the transverse wall 84 is formed with a downwardly facing annular shoulder 88 and an inverted bowl-shaped recess 90, as well as with a downwardly facing annular rib 91 at the margin of said recess. A circular boot 92 of resilient material, such as silicone rubber, has a central hub portion 93 formed with a bore 94. The boot 92 is also formed with an radially outwardly directed peripheral flange 95.

Disposed between the upper end of the sleeve 33 and the annular shoulder 88 on wall 84 is a stainless steel washer 96 which is overlayed with a stainless steel boot washer 97 as shown, the latter being formed with an coaxial upwardly directed tubular projection 98 at the margin of the central aperture thereof. The peripheral flange portion 95 of the boot 92 overlays the boot washer 97 radially outwardly of the projection 98 and is compressed between washer 97 and the annular rib 91. The shaft 78 has a snug sliding fit within the bore 94 of boot 92, the latter providing a seal for the upper end of the case 17. Because of its substantial thickness, the boot 92 also provides a vibration damping function for the shaft 78 and related movable parts.

Referring to FIGS. 1, 3, 4 and 5 to 7, the cylindrical base member 21 within the lower end of case 17 is suitably apertured to permit passage therethrough of turret type switch terminals numbered 1 through 8, said apertures being sealing closed by suitable potting material as best shown in FIGS. 5 to 7. The base 21 is also suitable apertured to receive turret type transducer terminals 9 through 12, and the apertures accomodating such terminals are also sealed with suitable potting material as shown. Additionally, base 21 is formed with a peripheral which is electrically connected to the metallic case 17.

Figure 4:
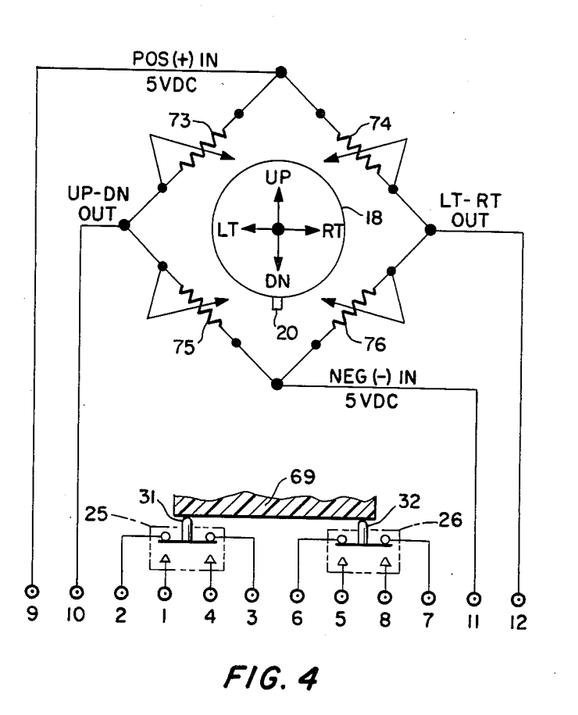
FIG. 4 is a schematic diagram showing the electrical circuit of the improved control device, as well as the actuator button and locator pin thereof.

Referring now to FIG. 4, wherein the transducers 73 to 76 are shown incorporated into a bridge circuit, it will be observed that one end of the transducer 73 is connected to the terminal 9, and the other end thereof is connected to the terminal 10. Also connected to the terminal 10 is one end of the transducer 75, the other end of which is connected to the terminal 11. One end of the transducer 74 is connected to the terminal 9, and the other end thereof is connected to the terminal 12. One end of the transducer 76 is also connected to the terminal 12, and the other end of said transducer is connected to the terminal 11.

As indicated in FIG. 4, the terminal 9 is intended for connection to the positive terminal of a direct current source, for example a source of 5 volts (not shown), and the terminal 11 is intended for connection to the negative terminal of the same direct current source. The terminals 10 and 12 are adapted for connection to electroresponsive apparatus to be controlled (not shown), which apparatus has one or more elements movable, for example, in suitable up or down and/or right or left attitudes.

The bridge circuit illustrated in FIG. 4 has no current flowing therethrough to apparatus to be controlled when the movable parts of control device 16 are in the at rest position illustrated in FIG. 5, since the transducers are not then subjected to deformation forces and the bridge circuit is therefore in balance. The transducers are strain sensitive, i.e. the resistivity thereof decreases when they are placed in compression, and the resistivity thereof increases when they are placed in tension. Thus, when the flexible bar portion 58 of the member 57 has its upper end flexed toward the left as viewed in FIG. 5 by movement of the button 18 to the left as viewed therein, the transducer 73 is placed in compression, and the transducer 75 is placed in tension. The resulting decrease in resistivity of the transducer 73 and increase in resistivity of the transducer 75 results in the delivery of a positive signal to the up-down terminal 10, in response to which an element of the controlled apparatus moves in an up direction. Conversely, if the knob 18 is moved to the right as viewed in FIG. 5, the transducer 75 is placed in compression and transducer 73 is placed in tension, so that the resultant decreased resistivity of the transducer 75 and increased resistivity of the transducer 73 causes a negative signal to be delivered to the up-down terminal 10, in response to which the aforementioned element of the controlled apparatus moves in a down direction.

Similarly, if the knob 18 is moved to the left as viewed in FIGS. 4 and 6, the transducer 76 is placed in compression and the transducer 74 is placed in tension, so that the resultant decreased resistivity of transducer 76 and increased resistivity of transducer 74 results in a negative signal being delivered to the left-right terminal 12, in response to which an element of the controlled apparatus moves in a left direction. On the other hand, when the knob 18 is moved toward the right as viewed in FIGS. 4 and 6, thereby placing the transducer 74 in compression and the transducer 76 in tension, the decreased resistivity of transducer 74 and increased resistivity of transducer 76 results in the delivery of a positive signal to the left-right terminal 12, in response to which the last mentioned element of the controlled apparatus moves in a right direction.

In FIG. 4 lateral movement of the button 18 from its at rest position along the orthoganally related axes aforedescribed is illustrated by the up-down and left-right arrows. Lateral movement in any other direction, i.e., simultaneously involving components of movement along both of the illustrated axes, results in the delivery of corresponding coordinate-related control signals being delivered to apparatus controlled through the terminals 10 and 12. The magnitude and polarity of the control signals supplied to the controlled apparatus through terminals 10 and 12, and the amount and direction of movement of said apparatus elements caused by such signals, is directly proportional to the amount and direction of the lateral force applied to button 18 and the amount and direction of the flexure of the flexible bar portion 58 produced thereby.

It will be observed that when the parts of the control device 16 are in the at rest position of FIG. 5 the lower end of the skirt 101 of the button 18 is positioned coaxially around and close to the hub 85. As a result, movement of the knob 18 in any lateral direction from its at rest position, for example by placement of the thumb of an operator in the knob recess 19 and exertion of lateral pressure thereon in a given direction, causes the lower edge of the skirt 101 to engage the hub 85 and cause the knob 18 to tilt about the tangential point of engagement, thereby correspondingly tilting the shaft 78 and causing flexure of the flexible bar portion 58.

Because the transducers 73 to 76 are very fragile and relatively expensive, the improved joystick control device of the present invention provides overload release means preventing flexure of the bar portion 58 sufficient to cause damage to any of those transducers. Such overload release means takes the form of the spring loaded articulated connection between the shaft 78 and the flexible bar portion 58. This is provided by the disc-shaped head 77 on shaft 78, cup-shaped portion 59 on the upper end of the flexible bar portion 58, bellville spring washers 81 and 82, and adjustable pretensioning nut 80. The position of the nut 80 within member 59 is set so that when the flexure of the bar portion 58 in response to lateral movement of button 18 reaches a predetermined safe limit, further movement of the knob 18 in the direction causing such flexure results in tilting of the shaft 78 with respect to the cup-shaped portion 59 and bar portion 58, as shown in FIG. 6. Such tilting is the result of flexure of the bellville washers permitting a rocking contact, for example at pivot point 103 illustrated in FIG. 6, of the rounded peripheral edge surface 89 of the head 77 on the flat inner surface 60 of cup-shaped portion 59. Tilting movement of the shaft 78 by lateral movement of the button 18 is limited to that which causes the tangential contact of the inner surface 102 of knob skirt 101 with the frustoconical outer surface 86 of the body hub 85, illustrated in FIG. 6.

It will be observed that the overload release feature is operative regardless of which lateral direction the knob 18 is moved from its neutral or at rest position shown in FIG. 5. In addition to the aforedescribed opertion in the transducer mode, the improved joystick type control device 16, is also operable in a depress or push button mode in which control is provided by axial movement of the button 18, rather than by lateral movement thereof. Operation in the depress mode provides for selective actuation of control means of which the push button switches 25 and 26 are the illustrated embodiments.

As aforementioned, the axial disposition of the movable parts of control device 16 in the at rest position shown in FIG. 5 is determined by seating of the detent balls 70 and 71 in the receiving openings 51 and 52 under the bias of the compression spring 72. In the event that it is desired to actuate the switches 25 and 26, the button 18 is axially depressed by the operator. Because of the detent action of the balls 70 and 71 and spring 72, a substantial axial downward pressure, for example a pressure of at least three pounds, must be exerted on the button 18 in order to force the balls inwardly toward each other against the bias of spring 72 as they move out of the openings 51 and 52. By virtue of the linear edge surface of the shoulders 53 and 54, the movement of the balls out of the openings 51 and 52 is significantly more abrupt than it would be if the openings 51 and 52 were circular and the edges thereof served as a ramp along which the balls moved on leaving said openings. The shoulders 53 and 54 thus provide a desirable precise detent release point at which the balls leave the openings 51 and 52, thereby providing the operator a good solid tactile indication at the time such release occurs, as well as positive actuation of switches 25 and 26.

As the movable parts travel axially downwardly in response to downward pressure on the knob 18, the ends of the transverse pin 64 (FIG. 6) travel within the slots 55 and 56 and prevent rotation of the transducer shaft 57 with respect to the sleeve 33. As the ends of the pin 64 approach the lower ends of the slots 55 and 56, the push buttons 31 and 32, which are moved downwardly by plunger 69, may reach the limit of their downward travel, for example, the position thereof illustrated in FIG. 7. In such a case, further downward movement of the transducer shaft 57 causes compression of the spring 67 by the plunger 66 which is prevented from further downward movement by the push buttons 31 and 32, and the washer 68 moves out of contact with the plunger 69 as the parts reach the positions shown in FIG. 7. This overtravel feature prevents damage to the switches 25 and 26. It will be observed that the position of the parts in FIG. 7 is determined by contact of the lower edge of the skirt 101 of button 18 with the outer surface of the transverse wall 84 at the base of the hub 85.

It will also be observed that, as shown in FIG. 7, when the movable parts are in the most depressed position thereof, the axis of the detent bore 65 is spaced slightly above the rectilinear shoulders 53 and 54 of the openings 52 and 51, respectively. As a result, the bias of the compression spring 72 on the balls 70 and 71 results in a continual upward bias being exerted on the transducer shaft 57 and related parts. Thus, upon release of the downward pressure on the button 18, the resultant upward movement of the movable parts returns them to their raised, at rest positions shown in FIG. 5.

An important feature of the improved joystick type control device 16 is that the structure thereof provides lockout means preventing simultaneous operation thereof in both the transducer and depress modes. In FIG. 7, the button 18 is shown in its most depressed position wherein the lower end of skirt 101 thereof is in contact with the transverse wall 84 of the body 17, and the inner skirt surface 102 thereat has a snug coaxial fit around the base of the hub 85. This fit prevents any lateral movement of the upper end of the shaft 78 away from the axially centered position thereof shown in FIG. 7.

Conversely, when the button 18 is moved laterally from its at rest position shown in FIG. 5 to the tilted position shown in FIG. 6 in which the inner skirt surface 102 is in tangential contact with the outer surface 86 of the hub 85, application of a depressing force on the button 18 sufficient to move the detent balls 70 and 71 out of the openings 51 and 52 and cause downward movement of the associated movable parts, causes the button skirt 101 to slide downwardly along the outer surface of the hub 85. This sliding movement brings the button 18 and its shaft 78 into coaxial alignment within the hub 85 as the lower end of the button skirt 101 moves into engagement with the transverse body wall 84 in the position shown in FIG. 7. As a result, the flexible bar portion 58 is always in unflexed position and the control device 16 is prevented from operation in the transducer mode whenever it is operated in the depress mode.

The substantial force required to be exerted axially on the button 18 in order to operate the control device 16 in its depress mode provides lockout means preventing inadvertent operation in the depress mode. A significant conscious act on the part of the operator is thereby required in order for the switches 25 and 26 to be actuated. Thus, the operator must intend actuation of the switches 25 and 26, and must intentionally exert the required substantial axial pressure on the button 18 in order to cause actuation of those switches.

Figure 14:
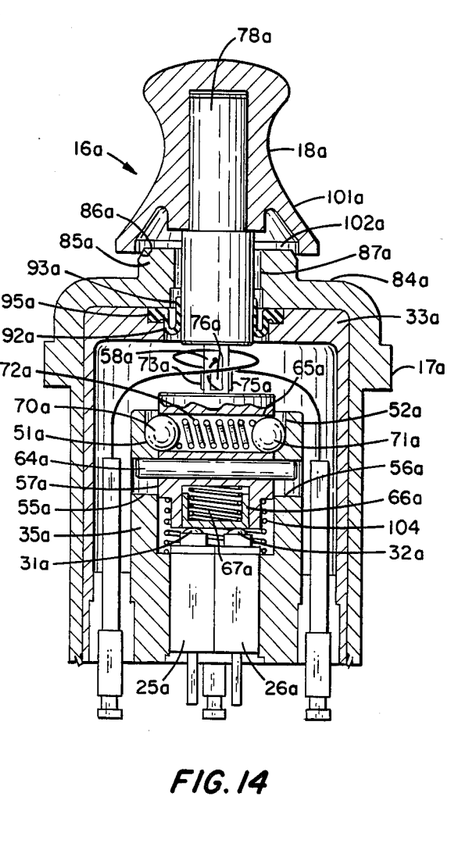
FIG. 14 is an axial sectional view taken through a control device in the depress mode. modified form of the improved control device and showing the parts thereof in the at rest position.
Figure 15:
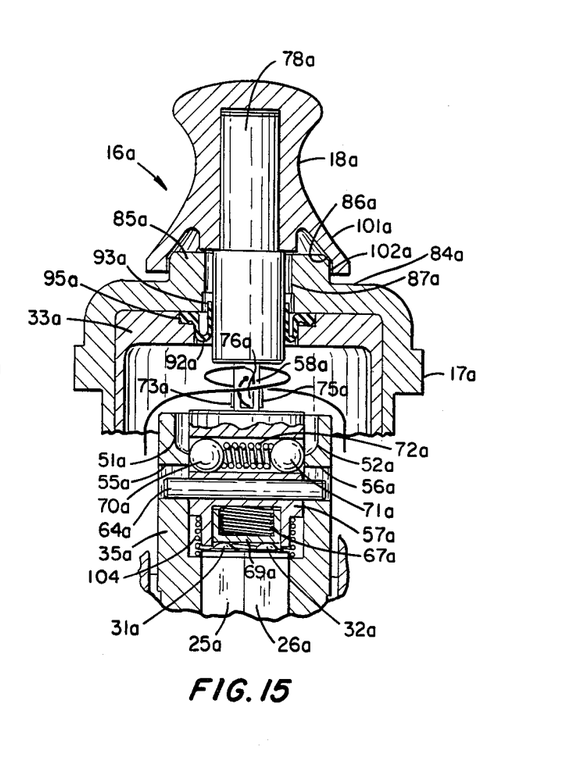
FIG. 15 is a fragmentary sectional view similar to FIG. 14 and showing the movable parts of the illustrated

A modified form of joystick type control device is illustrated in FIGS. 14 and 15, wherein reference characters including the subscript "a" correspond to the parts in FIGS. 1 to 13 indicated by the same reference characters without a subscript. It will be observed that the form of the invention illustrated in FIGS. 14 and 15 does not include a spring loaded articulated connection providing overload release protection for the transducers.

In FIGS. 14 and 15 the button 18a has a flared skirt portion 101a, the inner surface of which terminates at its lower end in a cylindrical surface portion 102a. The transverse body wall 84a is formed with an axially apertured hub 85a having a cylindrical outer surface which terminates at its upper end in an annular bevelled surface 86a. FIG. 14 shows the control device 16a in its at rest position corresponding to that shown in FIG. 5, whereas FIG. 15 illustrates the control device 16a in the depress mode wherein the position of button 18a and associated parts corresponds to that shown in FIG. 7.

The shaft seal 92a is of the rolling type, having a tubular central portion 93a coaxially bonded to the shaft 78a, and having a peripheral bead portion 91a clamped between the body wall 84a and the apertured upper end wall of sleeve 33a as shown. The shaft seal 92a is made of relatively thin flexible resilient material which accomodates lateral movement of the shaft 78a away from the at rest position thereof shown in FIG. 14 in the transducer mode, and which rolls axially with the shaft 78a in the depress mode.

The reduced diameter sleeve portion 35a is formed at its upper end with internal diametrically opposite axially extending grooves or latch ramps 51a and 52a into which the detent balls 70a and 71a are biased by the helical spring 72a when the device 16a is in its at rest position shown in FIG. 14. A helical compression spring 104 biases the slidable transducer shaft 57a upwardly, and the at rest position of said member is defined by abuttment of the ends of the pin 64a with the upper ends of the slots 55a and 56a as shown in FIG. 14.

In operation of the control device 16a in the transducer mode, the button 18a can be moved in any selected lateral direction away from its neutral or at rest position shown in FIG. 14, any such movement causing corresponding flexure of the flexible bar portion 58a and corresponding response of the transducers 73a to 76a. The limit of such lateral button movement is that which causes contact of the lower edge of the button skirt 101a with the bevelled hub surface 86a. Upon release of the lateral pressure on the button 18a, the flexible bar portion 58a returns to its unflexed condition shown in FIG. 14, with corresponding response of the transducers to such return movement.

In operation of the control device 16a in the depress mode, an axial downward pressure on the button 18a of at least three pounds is required to force the detent balls 70a and 71a inwardly against the bias of the detent spring 72a and also to overcome the upward bias of the spring 104. The limit of downward movement of transducer shaft member 57a and associated parts which can be caused by axial depression of button 18a is defined by contact of the pin 64a with the lower ends of the slots 55a and 56a as shown in FIG. 15.

In the event that the buttons 31a and 32a of switches 25a and 26a reach the lower limit of their range of travel before the pin 64a reaches the lower ends of the slots 55a and 56a, said buttons stop in such limiting positions as the downward movement of the transducer shaft 57a continues. Buttons 25a and 26a thereafter prevent further downward travel of the plunger 69a and cause compression of the overtravel spring 67a as the transducer shaft 57a moves to the position of FIG. 15. This action of the plunger 69a and overtravel spring 67a prevents damage to the internal mechanisms of the switches 25a and 26a.

Upon removal of downward pressure on the button 18a, return movement of the member 57a is initiated by the bias of the return spring 104, and the balls 70a and 71a snap into the latch ramps 51a and 52a under the bias of spring 72a as the ends of the pin 64a approach the upper ends of the slots 55a and 56a. During such return movement, the overtravel spring 67a returns to its relatively uncompressed state and returns plunger 69a to the position thereof shown in FIG. 14.

It will be observed that when the button 18a is in the depressed position shown in FIG. 15, the cylindrical inner surface 102a of the button skirt 101a is in telescopic relationship with the cylindrical hub 85a. In this position the button 18a cannot be moved to any substantial degree in any lateral direction. This relationship provides a lockout mechanism preventing operation of the control device 16a in the transducer mode while it is in the depress mode.

Conversely, if axial depressing force is exerted on the button 18a while the latter is in a laterally moved position wherein the lower edge of the button skirt 101a is in contact with the bevelled hub surface 86a, such axial depressing force causes the lower edge of the skirt 101a to slide down the bevelled surface 86a to thereby position the button 18a, shaft 78a and flexible bar portion 58a coaxially with respect to the hub 85a and case 17a. Continued application of depressing force on the button 18a then moves the parts to the position shown in FIG. 15 wherein any substantial lateral movement of button 18a is prevented. Thus, the control device 16a is automatically taken out of the transducer mode whenever depressing movement is imparted to the button 18a while in the tranducer mode.

The coaction with transducer shaft 57a of the spring biased detent balls 70a and 71a, the latch ramps 51a and 52a and the return spring 104 provides lockout means preventing inadvertent placement of the parts of control device 16a in a depress mode by requiring that a substantial depressing force, such as a force of three pounds, be exerted on the button 18a in order to cause downward movement of the transducer shaft member 57a. Thus, the operator must intend actuation of switches 25a, and 26a, and apply the required substantial depressing force to button 18a, in order to cause actuation of said switches.

Various changes and modifications in the illustrated embodiments of the invention will suggest themselves to those skilled in the art and can be made without departing from the spirit of the invention. For example, control means of other suitable types may be substituted for the snap switches 25, 26, 25a and 26, and in particular, other types of switches may be used as suitable or desired. All of such changes and alternatives are contemplated as may come within the scope of the appended claims.

We claim:

1. In combination with at least one precision electrical switch control means having first actuator means for said precision electrical switch control means mounted for movement between a first switch controlling position and a second switch controlling position; second actuator means having a first portion cooperable with said first actuator means and mounted for movement along a first axis from a first position to a second position to thereby cause corresponding movement said first actuator means from said first switch controlling position to the second switch controlling position thereof, said second actuator means also having a second portion comprising flexible bar means extending in the general direction of said first axis; electrical transducer means connected to said flexible bar means and responsive to flexure of the latter along orthogonally related second and third axes to output an electrical current reflective of amount of flexure; and remote actuator means operatively connected to said flexible bar means and movable to cause lateral movement in any direction relative to said first axis to thereby cause flexure in said second portion of said flexible bar means, said remote actuator means also being movable in the direction of said first axis from a first position to a second position to cause corresponding movement of said first portion of said second actuator means along said first axis and thereby actuation of said first actuator means from the first switch controlling position toward the second switch controlling position of said at least one precision electrical switch control means.

2. The combination of claim 1 wherein said at least one precision electrical switch control means is a snap switch and further including biasing means for said second actuator means, said biasing means being operable to bias said second actuator means toward its first position.

3. The combination of claim 1 which further comprises lock-out means arranged and configured to be operable for preventing operable lateral movement of said remote actuator means and resulting flexure of said flexible bar means when said remote actuator means is moved a predetermined distance along said first axis from a first position toward a second position thereof.

4. The combination of claim 1 which further includes a casing and wherein said second actuator means is disposed within said casing, said casing being formed with a casing aperture, said remote actuator means comprises a digitally engageable button located externally of said casing and a button shaft generally coaxial with said first axis and extending generally centrally through said casing aperture, said button being mounted on said button shaft, and said casing aperture being arranged, located and sized relative to said button and button shaft to permit predetermined lateral displacement of said button and said button shaft in any direction away from said first axis.

5. The combination of claim 4 wherein said button is characterized as being operable to move along said first axis and which further comprises cooperating shoulder means on said button and said casing preventing said lateral displacement of said button when said button is moved a predetermined distance along said first axis from a first position toward a second position.

6. The combination of claim 5 wherein said cooperating shoulder means are an annular skirt on said button and an annular shoulder on said casing surrounding said casing aperture.

7. The combination of claim 6 wherein said annular skirt has a frustoconical inner surface and said annular shoulder has a frustoconical outer surface for cooperation with said frustoconical inner surface of said button skirt, the dimensional and geometric relationship between said frustoconical inner surface and said frustoconical outer surface being arranged and located whereby the said frustoconical inner surface and said frustoconical outer surface can normally be moved into tangential contact by said lateral movement of said button in any direction.

8. The combination of claim 7 wherein said annular shoulder has a diameter of predetermined size at the outer surface of said annular shoulder at the base thereof, and said annular skirt has a diameter of predetermined size at the diameter of the inner surface of said button skirt at the edge of said skirt which is substantially equal to said predetermined size of said annular shoulder, said skirt being of such length that when said button is in its said second position, the edge portion of said skirt telescopically surrounds said annular shoulder and abuts the casing thereat.

9. The combination of claim 6 wherein said annular skirt has a generally cylindrical inner surface and said annular shoulder has a generally cylindrical outer surface terminating at the end thereof spaced from the casing in an annular frustoconical bevelled surface, the relationship of said cylindrical inner surface and said cylindrical outer surface being arranged and located to normally permit limited lateral movement of said button in any direction before contact of the said inner surface with said outer surface.

10. The combination of claim 9 wherein said cylindrical skirt inner surface has a predetermined dimensional relationship to said outer surface, said relationship being a dimension only slightly larger in diameter than the annular shoulder cylindrical outer surface, whereby when said button is in its said second position said button skirt has a telescopic fit around said cylindrical shoulder outer surface.

11. The combination of claim 1 which further comprises lock-out means preventing inadvertent movement of said remote actuator means and of said second actuator means from their first positions toward their second positions, said lock-out means also comprising detent means, said detent means being cooperable to require a predetermined substantial actuating force to be exerted on said remote actuator means in the direction of said first axis and toward said second position of said remote actuator means to cause initiate movement of the said remote actuator means from its first position toward its second position.

12. The combination of claim 11 further comprising a sleeve member and wherein said second actuator means first portion has a telescopic slideable fit within said sleeve member, said sleeve member having at least one cutaway portion defining sleeve shoulder means, said first portion being formed with a recess means, spring loaded detent means located in said recess means, said spring loaded detent means, when said second actuator means is in its first position, being biased into said cut away sleeve portion into engagement with said sleeve shoulder means.

13. The combination of claim 12 wherein said sleeve shoulder means has a rectilinear edge portion over which said detent means travels on movement out of said cut away portion when said second actuator means moves from its first position toward its second position.

14. The combination of claim 12 wherein said recess means of said first portion is characterized as a diametrical bore formed in said first portion, and said spring-loaded detent means comprises a pair of spherical balls and spring means operable to bias said balls outwardly in opposite directions into accomodating cutaway portions formed in said sleeve member, each of said cutaway portions having a rectilinear edge portion over which the respective cooperating ball travels on movement out of the respective cutaway portion when said second acutator means moves from its first position toward its second position.

15. The combination of claim 14 being further characterized such that the parts are arranged and located such that movement of said second actuator means to its second position is such that the axis of said transverse bore does not intersect said rectilinear edge portions, wherefore said spring means of said detent means is effective to bias said second actuator means toward its said first position.

16. The combination of claim 14 being further characterized and wherein said second actuator means first portion and said sleeve are provided with cooperating shoulder means preventing relative rotation thereof.

17. The combination of claim 4 which further comprises a boot of resilient rubber-like material having an apertured central hub portion through which said button shaft projects, said boot being peripherally secured to said casing at the margins of said casing aperture and providing a dust seal for the interior of said casing, said boot being of sufficient thickness to provide vibration energy absorption and thereby provide a vibration damping function for said button shaft.

18. In combination, a base, flexible bar means anchored at one end to said base and projecting therefrom generally along a first axis; transducer means operatively related to said flexible bar means and responsive to flexure of the latter along orthogonally related second and third axes, remote actuator means, connection means between said remote actuator means and a portion of said flexible bar means remote from said base, said remote actuator means being movable laterally in any direction relative to said first axis to cause flexure through said connection means in said any direction of said flexible bar means; said connection means between said remote actuator means and said flexible bar means being characterized as comprising spring means and articulated means, said connection means being further characterized as being operable through said spring means and said articulated means to normally maintain said remote actuator means in alignment with said flexible bar means, said spring means of said connection means being located and arranged such that exertion on said remote actuator means of a predetermined lateral force in any direction with respect to said first axis causes pivoting in said direction of said remote actuator means relative to said flexible bar means to thereby limit by preselected amount the flexure of said flexible bar means which can be affected by exertion of lateral force on said remote actuator means.

19. The combination of claim 18 wherein the spring means of said connection means is adjustable and operable on adjustment to change the preselected limit amount of flexure of said flexible bar means.

20. The combination of claim 18 wherein said remote actuator means comprises a digitally engageable actuator button and a button shaft projecting from said button, said connection means comprises a means on said button shaft having a flat transverse end face and means on the flexible bar having a flat transverse end face, one of said end faces being circular and being formed with a rounded peripheral edge surface portion, said spring means biasing said end faces into parallel face to face abutting relationship, said button shaft and flexible bar means being relatively tiltable on said rounded peripheral edge surface portion in any lateral direction with respect to each other against the bias of said spring means on exertion of a predetermined lateral force on said actuator button in said lateral direction.

21. The combination of claim 20 wherein the amount of bias exerted by said spring means is adjustable.

22. The combination of claim 20 wherein said circular end face having a rounded peripheral edge surface portion is formed on a disc-shaped head, and the other flat transverse end face is a circular inner end face on a cup-shaped member within which said disc-shaped head is received.

23. The combination claim 22 being further characterized wherein said disc-shaped head is mounted on said button shaft, said cup-shaped member is mounted on said flexible bar means, and said spring means is located in said cup-shaped member with first and second spring portions, said first spring portion engaging the side of said disc-shaped head opposite the flat end surface thereof, there being shoulder means on said cup-shaped member engaging said second portion of said spring means.

24. The combination of claim 23 wherein said spring means comprises at least one bellville spring washer, and said shoulder means comprises an externally threaded nut threaded into the interior of said cup-shaped member and adjustably positionable to place said spring means under predetermined selected stress.

25. The combination of claim 1 which further comprises connection means between said remote actuator means and said flexible bar means which normally maintains said remote actuator means in alignment with said flexible bar means, said connection means comprising articulation means and spring means, said spring means being operable through said articulated means such that exertion on said remote actuator means of a predetermined lateral force in any direction with respect to said first axis will cause pivoting in said direction of said remote actuator means relative to said flexible bar means to thereby limit the flexure of said flexible bar means which can be effected by exertion of lateral force on said remote actuator means.

26. The combination of claim 25 wherein the spring means of said connection means is characterized as being adjustable to in turn provide an adjustable preselected limit of amount of flexure of said flexible bar means through said connection means.

27. The combination of claim 25 wherein said remote actuator means comprises a digitally engageable actuator button having a button shaft projecting therefrom, said connection means comprises means on said button shaft having a flat transverse end face and means on the flexible bar means having a flat transverse end face, one of said end faces being circular and being formed with a rounded peripheral edge surface portion, there being spring means biasing said end faces into parallel face to face abutting relationship, said button shaft and flexible bar means being relatively tiltable on said rounded peripheral edge surface portion in any lateral direction with respect to each other against the bias of said spring means on exertion of predetermined force on said actuator button in said lateral direction.

28. The combination of claim 27 wherein the spring means may be adjusted to change the bias exerted thereby.

29. The combination of claim 27 wherein said circular end face having a rounded peripheral edge surface portion is formed on a disc-shaped head, and the other flat transverse end face is a circular inner end face on a cup-shaped member within which said disc-shaped head is received.

30. The combination of claim 29 wherein said disc-shaped head is mounted on said button shaft, said cup-shaped member is mounted on said flexible bar means, and said spring means is located in said cup-shaped member engaging the side of said disc-shaped head opposite the flat end surface thereof, there being shoulder means on said cup-shaped member engaging said spring means.

31. The combination of claim 30 wherein said spring means comprises at least one bellville spring washer, and said shoulder means comprises an externally threaded nut threaded into the interior of said cup-shaped member and adjustably positionable to place said spring means under predetermined selected stress.

* * * * *